(12) United States Patent
Islam et al.

(10) Patent No.: US 11,722,917 B2
(45) Date of Patent: Aug. 8, 2023

(54) COMMUNICATION DEVICE HAVING MOBILITY MANAGEMENT BEAM STEERING FOR REDUCED INTERFERENCE

(71) Applicant: MOTOROLA MOBILITY LLC, Wilmington, DE (US)

(72) Inventors: Md Rashidul Islam, Glen Ellyn, IL (US); Md Faisal Abedin, Lisle, IL (US); Mohammed R. Abdul-Gaffor, Palatine, IL (US)

(73) Assignee: Motorola Mobility LLC, Chicago, IL (US)

( * ) Notice: Subject to any disclaimer, the term of this patent is extended or adjusted under 35 U.S.C. 154(b) by 141 days.

(21) Appl. No.: 17/318,468

(22) Filed: May 12, 2021

(65) Prior Publication Data
US 2022/0369134 A1 Nov. 17, 2022

(51) Int. Cl.
*H04W 24/08* (2009.01)
*H04W 16/28* (2009.01)
*H04W 24/10* (2009.01)
*H04W 8/02* (2009.01)
*H04W 8/00* (2009.01)
*H04W 64/00* (2009.01)
*H04W 76/14* (2018.01)

(52) U.S. Cl.
CPC ........... *H04W 24/08* (2013.01); *H04W 8/005* (2013.01); *H04W 8/02* (2013.01); *H04W 16/28* (2013.01); *H04W 24/10* (2013.01); *H04W 64/00* (2013.01); *H04W 76/14* (2018.02)

(58) Field of Classification Search
CPC ........ H10B 43/35; H10B 41/10; H10B 41/35; H10B 43/10; G11C 16/0466; G11C 16/10; G11C 16/16; G11C 16/26; H01L 29/40117; H01L 29/4234; H01L 29/6656; H01L 29/7881; H01L 29/7923; H01L 29/792
See application file for complete search history.

(56) References Cited

U.S. PATENT DOCUMENTS

| 2020/0145977 | A1* | 5/2020 | Kumar | H04L 5/0048 |
| 2020/0187253 | A1* | 6/2020 | Cui | H04W 16/14 |
| 2021/0328630 | A1* | 10/2021 | Ryu | H04B 7/0695 |

(Continued)

FOREIGN PATENT DOCUMENTS

WO WO-2022147811 A1 * 7/2022

*Primary Examiner* — Hashim S Bhatti
(74) *Attorney, Agent, or Firm* — Isidore PLLC (57) ABSTRACT

A communication device, computer program product, and method mitigate interference during mobility management of antenna beam selection. A controller of the communication device determines a first direction to a first downlink from a base station downlink that is beam steered toward the communication device. The controller determines a second direction to a second downlink from the base station that is beam steered toward a second communication device. The controller determines a scan cone of two or more beam entries oriented generally in the first direction and being at least one of angularly narrowed or directed away from the second direction to avoid receiving the second downlink. The controller configures the RF frontend of the communication device with a reduced codebook based on a subset of the two or more beam entries within the scan cone for mobility management of the communication device.

20 Claims, 8 Drawing Sheets

(56) References Cited

U.S. PATENT DOCUMENTS

| | | | |
|---|---|---|---|
| 2021/0328639 A1* | 10/2021 | Karakkad Kesavan Namboodiri | H04B 7/0695 |
| 2022/0094421 A1* | 3/2022 | Zhu | H04B 7/0854 |
| 2022/0103324 A1* | 3/2022 | Ly | H04W 72/1268 |
| 2022/0248246 A1* | 8/2022 | Berliner | H04B 7/0695 |
| 2022/0279520 A1* | 9/2022 | Tsui | H04W 72/042 |
| 2022/0352915 A1* | 11/2022 | Abedini | H04B 1/1081 |
| 2022/0361004 A1* | 11/2022 | Kwon | H04W 16/28 |

\* cited by examiner

COMMUNICATION DEVICE HAVING MOBILITY MANAGEMENT BEAM STEERING FOR REDUCED INTERFERENCE

BACKGROUND

1. Technical Field

The present disclosure relates generally to communication devices having antenna arrays with electronically steerable antenna gain, and more particularly to communication devices that mitigate interference using electronically steerable antenna gain.

2. Description of the Related Art

The evolution of cellular communication devices has included use of higher frequency bands capable of carrying more data. These higher frequencies become more directional as a function of frequency. Antenna elements are operated as an array to achieve antenna steering in particular directions. Antenna steering enables selection of a particular antenna beam that provides the best communication quality. Mobility management dynamically switches to the best beam angle as the relative angle changes between the communication device and the base station. For example, fifth generation new radio (5G NR) mobility management is defined in the 3rd Generation Partnership Project (3GPP) standards Release 15-16, which includes procedures for mobility management. The communication device periodically performs transmit and receive beam sweeping to determine reference signal receive power measurements across up to 64 beams. For power and computational efficiency, the communication device selects an acquisition cone comprised of a subset of eight (8) beams of the 64 beams for mobility management. The acquisition cone is sufficient to maintain mobility management with typical movements of the communication device. Although each beam is narrow, the beam does have a cone angle that can intercept an interfering signal. Also, while a particular beam may have the best measurement for a reference signal, an interfering signal may render the particular beam unsuitable.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

A communication device, a computer program product, and a method mitigate interference during mobility management of antenna beam selection. The communication device includes a radio frequency (RF) frontend that is communicatively coupled to a particular antenna array of at least one antenna array. A memory contains a codebook manager application and a codebook containing two or more beam entries defined by a magnitude setting and a phase setting respectively for each antenna element of the particular antenna array. Each beam entry is used to configure the RF frontend to spatially steer a primary antenna gain of the particular antenna array in a respective direction relative to the communication device. A controller is communicatively coupled to the RF frontend and the memory. The controller executes the codebook manager application to configure the communication device to perform functionality for mobility management. The functionality includes determining a first direction to a first downlink from a base station. A base station beam steers the first downlink toward the communication device. The functionality includes determining a second direction to a second base station downlink that is beam steered toward a second communication device. The functionality includes determining a scan cone of two or more beam entries oriented generally in the first direction and being at least one of angularly narrowed and directed away from the second direction to avoid receiving the second base station downlink. The functionality includes configuring the RF frontend of the communication device with a reduced codebook based on a subset of the two or more beam entries within the scan cone for mobility management of the communication device. The scan cone defines beams that receive periodic scan measurements.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

Figure 1:
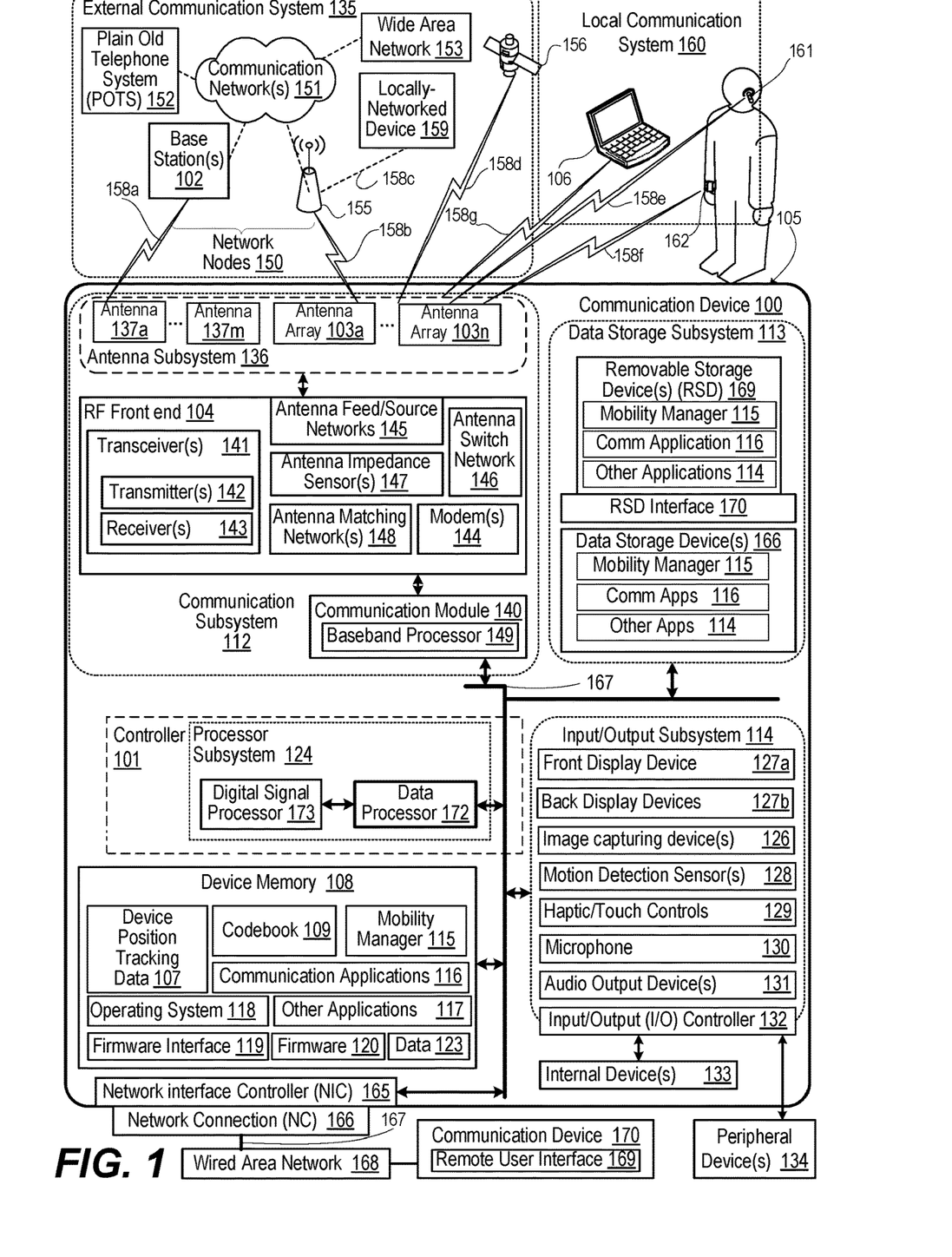
FIG. 1 depicts a functional block diagram of a communication environment of a communication device that mitigates device-to-device interference during mobility management of antenna beam selection, and within which the features of the present disclosure are advantageously implemented, according to one or more embodiments.

FIG. 1 is a functional block diagram of an electronic device, and more particularly communication device 100, which is managed by controller 101, in an operating environment and within which the features of the present disclosure are advantageously implemented. Communication device 100 communicates with base station 102 using at least one antenna array 103a-103n of radio frequency (RF) front end 104. The at least one antenna array 103a-103n is positioned within housing 105 to transmit selectively in all directions from communication device 100. To maintain or prepare for a connection with base station 102, RF front end 104 performs reference signal receive power measurements for base station 102. According to aspects of the present innovation, RF front end 104 also performs reference signal receive power measurements for other nearby second communication devices 106 that are camped on or connected to base station 102. The measurements include relative location information. Controller 101 tracks the relative position of nearby communication devices 106 as device position tracking data 107 in device memory 108. Controller 101 selects a subset of entries in codebook 109 that are sufficient for mobility management. When a periodic scan is performed, reference signals from the base station 102 are expected to be found within the scan cone defined by the subset of entries. Since the subset is less than the total number of entries in codebook 109, RF front end 104 can more efficiently perform the scan in less time and using less processing. Controller 101 selects the subset of entries not only to maintain communication with base station 102 during mobility of communication device 100 but also to mitigate interference due to communications between base station 102 and second communication device 106. Controller 101 configures RF front end 104 with a magnitude setting and a phase setting for each antenna element of the at least one antenna array 103a-103n, as specified in a particular entry from the subset of entries in the codebook 109.

Communication device 100 can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless and/or wired communication functionality. As an electronic device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem. Within the description of the remaining figures, references to similar components presented in a previous figure are provided the same reference numbers across the different figures. Where the named component is presented with different features or functionality, a different reference numeral or a subscripted reference numeral is provided (e.g., 100a in place of 100).

Referring to the specific component makeup and the associated functionality of communication device 100 of FIG. 1. In one or more embodiments, communication device 100 includes device memory 108, communication subsystem 112, data storage subsystem 113, and input/output (I/O) subsystem 114. Device memory 108 and each subsystem (112, 113, and 114) are managed by controller 101. Device memory 108 includes program code and applications such as mobility management application ("mobility manager") 115, communication applications 116, and other application(s) 117 that use communication services. Device memory 108 further includes operating system (OS) 118, firmware interface 119, such as basic input/output system (BIOS) or Uniform Extensible Firmware Interface (UEFI), and firmware 120. Device memory 108 includes codebook 109 and device position tracking data 107 used by mobility management application 115. Device memory 108 includes other computer data 123 used by communication applications 116 and other applications 117.

Processor subsystem 124 of controller 101 executes program code to provide operating functionality of communication device 100. The software and/or firmware modules have varying functionality when their corresponding program code is executed by processor subsystem 124 or secondary processing devices within communication device 100. Processor subsystem 124 of controller 101 can execute program code of communication applications 116 and other applications 117 to configure communication device 100. Processor subsystem 124 of controller 101 also executes program code of mobility management application 115, which uses codebook 109 and device position tracking data 107, to configure communication device 100.

I/O subsystem 114 includes image capturing device(s) 126. I/O subsystem 114 includes user interface devices such as front and back flexible display devices 127a-127b, motion detection sensors 128, touch/haptic controls 129, microphone 130, and audio output device(s) 131. I/O subsystem 114 also includes I/O controller 132. In one or more embodiments, motion detection sensors 128 can detect an orientation and movement of the communication device 100. In one or more embodiments, motion detection sensors 128 are used for functions other than user inputs, such as detecting an impending ground impact. I/O controller 132 connects to internal devices 133, which are internal to housing 105, and to peripheral devices 134, such as external speakers, which are external to housing 105 of communication device 100. Examples of internal devices 133 are computing, storage, communication, or sensing components depicted within housing 105. I/O controller 132 supports the necessary configuration of connectors, electrical power, communication protocols, and data buffering to act as an interface to internal devices 133 and peripheral devices 134 to other components of communication device 100 that use a different configuration for inputs and outputs.

Communication subsystem 112 of communication device 100 enables wireless communication with external communication system 135. Communication subsystem 112 includes antenna subsystem 136 having lower band antennas 137a-137m and higher band antenna arrays 103a-103n that can be attached in/at different portions of housing 105. Communication subsystem 112 includes radio frequency (RF) front end 104 and communication module 140. RF front end 104 includes transceiver(s) 141, which includes transmitter(s) 142 and receiver(s) 143. RF front end 104 further includes modem(s) 144. RF front end 104 includes antenna feed/source networks 145, antenna switch network 146, antenna impedance sensor(s) 147, and antenna matching network(s) 148. Communication module 140 of communication subsystem 112 includes baseband processor 149 that communicates with controller 101 and RF front end 104. Baseband processor 149 operates in a baseband frequency range to encode data for transmission and decode received data, according to a communication protocol. Modem(s) 144 modulate baseband encoded data from communication module 140 onto a carrier signal to provide a transmit signal that is amplified by transmitter(s) 142. Modem(s) 144 demodulates each signal received from external communication system 135 detected by antenna subsystem 136. The received signal is amplified and filtered by receiver(s) 143, which demodulate received encoded data from a received carrier signal. Antenna feed/source networks 145 transmits or receives from particular portions of antenna subsystem 136 and can adjust a phase between particular portions of antenna subsystem 136. Antenna switch network 146 can connect particular combinations of antennas (137a-137m, 103a-103n) to transceiver(s) 141. Controller 101 can monitor changes in antenna impedance detected by antenna impedance sensor(s) 147 for determining portions of antenna subsystem 136 that are blocked. Antenna matching network(s) 148 are connected to particular lower band antennas 137a-137m to tune impedance respectively of lower band antennas 137a-137m to match impedance of transceivers 141. Antenna matching network(s) 148 can also be used to detune the impedance of lower band antennas 137a-137m to not match the impedance of transceivers 141 to electromagnetically isolate a particular antenna.

In one or more embodiments, controller 101, via communication subsystem 112, performs multiple types of over-the-air (OTA) communication with network nodes 150 of external communication system 135. Particular network nodes 150 can be part of communication networks 151 of public land mobile networks (PLMNs) that provide connections to plain old telephone systems (POTS) 152 for voice calls and wide area networks (WANs) 153 for data sessions. WANs 153 can include Internet and other data networks. The particular network nodes 150 can be cellular "cells", base nodes, or base stations 102 that support cellular OTA communication using RAT as part of a radio access network (RAN). Unlike earlier generations of cellular services, where voice and data were handled using different RATs, both are now integrated, with voice being considered one kind of data communication. Conventionally, broadband, packet-based transmission of text, digitized voice, video, and multimedia communication are provided using Fourth generation (4G) RAT of evolved UTMS radio access (E-UTRA), referred to a Long Term Evolved (LTE), although some cellular data service is still being provided by third generation (3G) Universal Mobile Telecommunications Service (UMTS). A fifth generation (5G) RAT, referred to as fifth generation new radio (5G NR), is being deployed to at least augment capabilities of 4G LTE with a yet higher capability of data transfer. Development continues for what will be six generation (6G) RATs and more advanced RATs. With wireless frequency spectrum seemingly ever expanding, additional antennas 137a-137m are incorporated to support newer radio access technologies (RATs) and multi band operation. Dual low band (2L) or quad low band (4L) multiple input multiple output (MIMO) operation dictates multiple antennas communicate on multiple bands simultaneously.

In one or more embodiments, network nodes 150 can be access node(s) 155 that support wireless OTA communication. Communication subsystem 112 can receive OTA communication from location services such as provided by global positioning system (GPS) satellites 156. Communication subsystem 112 communicates via OTA communication channel(s) 158a with base stations 102. Communication subsystem 112 communicates via wireless communication channel(s) 158b with access node 155. In one or more particular embodiments, access node 155 supports communication using one or more IEEE 802.11 wireless local area network (WLAN) protocols. Wi-Fi is a family of wireless network protocols, based on the IEEE 802.11 family of standards, which are commonly used between user devices and network devices that provide Internet access. In one or more particular embodiments, communication subsystem 112 communicates with one or more locally networked devices 159 via wired or wireless link 158c provided by access node 155. Communication subsystem 112 receives downlink broadcast channel(s) 158d from GPS satellites 156 to obtain geospatial location information.

In one or more embodiments, controller 101, via communication subsystem 112, performs multiple types of OTA communication with local communication system 160. In one or more embodiments, local communication system 160 includes wireless headset 161 and smart watch 162 that are coupled to communication device 100 to form a personal access network (PAN). Communication subsystem 112 communicates via low power wireless communication channel(s) 158e with headset 161. Communication subsystem 112 communicates via second low power wireless communication channel(s) 158f, such as Bluetooth, with smart watch 162. In one or more particular embodiments, communication subsystem 112 communicates with second communication device(s) 106 via wireless link 158g to form an ad hoc network for a peer-to-peer communication session.

Data storage subsystem 113 of communication device 100 includes data storage device(s) 166. Controller 101 is communicatively connected, via system interlink 167, to data storage device(s) 166. Data storage subsystem 113 provides applications, program code, and stored data on nonvolatile storage that is accessible by controller 101. For example, data storage subsystem 113 can provide a selection of program code and applications such as communication applications 116 and other application(s) 117 that use communication services. These applications can be loaded into device memory 108 for execution by controller 101. In one or more embodiments, data storage device(s) 166 can include hard disk drives (HDDs), optical disk drives, and/or solid-state drives (SSDs), etc. Data storage subsystem 113 of communication device 100 can include removable storage device(s) (RSD(s)) 169, which is received in RSD interface 170. Controller 101 is communicatively connected to RSD 169, via system interlink 167 and RSD interface 170. In one or more embodiments, RSD 169 is a non-transitory computer program product or computer readable storage device. Controller 101 can access RSD 169 or data storage device(s) 166 to provision communication device 100 with program code, such as communication applications 116 and other applications 117. When executed by controller 101, the program code causes or configures communication device 100 to provide the mobility management functionality described herein.

Controller 101 includes processor subsystem 124, which includes one or more central processing units (CPUs), depicted as data processor 172. Processor subsystem 124 can include one or more digital signal processors 173 that are integrated with data processor 172 or are communicatively coupled to data processor 172, such as baseband processor 149 of communication module 140. In one or embodiments that are not depicted, controller 101 can further include distributed processing and control components that are peripheral or remote to housing 105 or grouped with other components, such as I/O subsystem 114. Data processor 172 is communicatively coupled, via system interlink 167, to device memory 108. In one or more embodiments, controller 101 of communication device 100 is communicatively coupled via system interlink 167 to communication subsystem 112, data storage subsystem 113, and input/output subsystem 114. System interlink 167 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (interlink 167) are illustrated in FIG. 1, it is to be understood that more, fewer, or different interconnections may be present in other embodiments.

Controller 101 manages, and in some instances directly controls, the various functions and/or operations of communication device 100. These functions and/or operations include, but are not limited to including, application data processing, communication with second communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Figure 2:
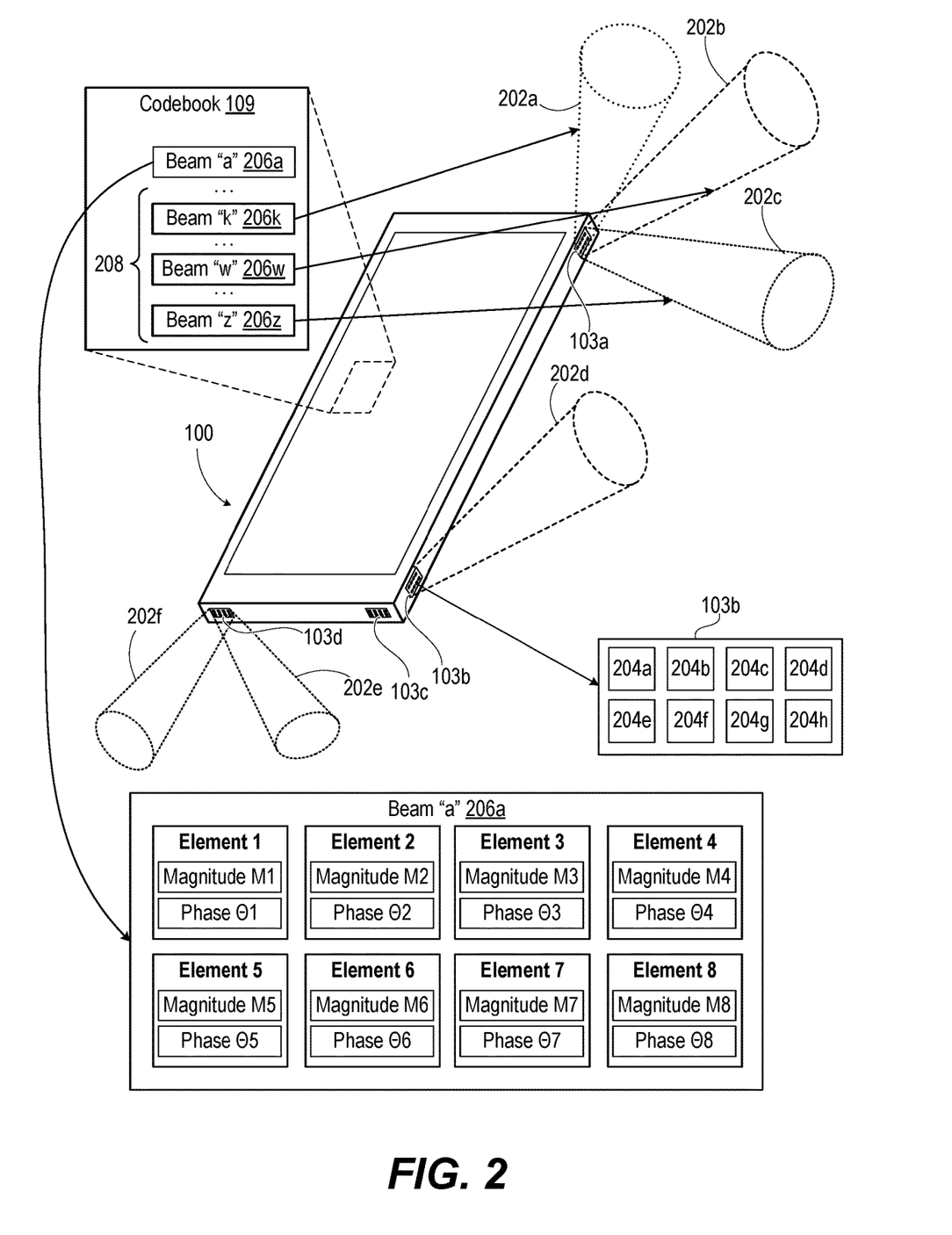
FIG. 2 depicts a three-dimensional view of the communication device using a codebook for mobility management, according to one or more embodiments.

FIG. 2 depicts a three-dimensional view of communication device 100 configured by mobility management application 115 using codebook 109 for mobility management to use beams 202a-202f via antenna arrays 103a-103d that are positioned on communication device 100 for spatial coverage and for diversity. As an example, antenna array 103a can be configured for beam 202b. Antenna array 103b can be configured for beam 202d that has the same angular direction or vector as beam 202b. For this particular beam direction, one of antenna arrays 103a-103b can be selected in the event of antenna blocking by user contact. Both antenna arrays 103a-103b can be selected for concurrent communication in the same direction. Other antenna arrays 103c-103d can be used for beam directions not supported by antenna arrays 103a-103b. For clarity, each antenna array 103a-103d is a 2×4 array of antenna elements 204a-204h. In one or more embodiments, the number and arrangements of antenna elements can be different, such as 1×4 array, 3×8 array, etc. Codebook 109 includes codebook entries 206a-206z for configuring phase and magnitude of each antenna element 204a-204h of selected antenna arrays 103a-103d. For efficiency, controller 101 (FIG. 1) selects subset 208 of codebook entries 206k-206z for active measurement to support mobility management. Subset 208 can be referred to as a "reduced codebook".

Figure 3:
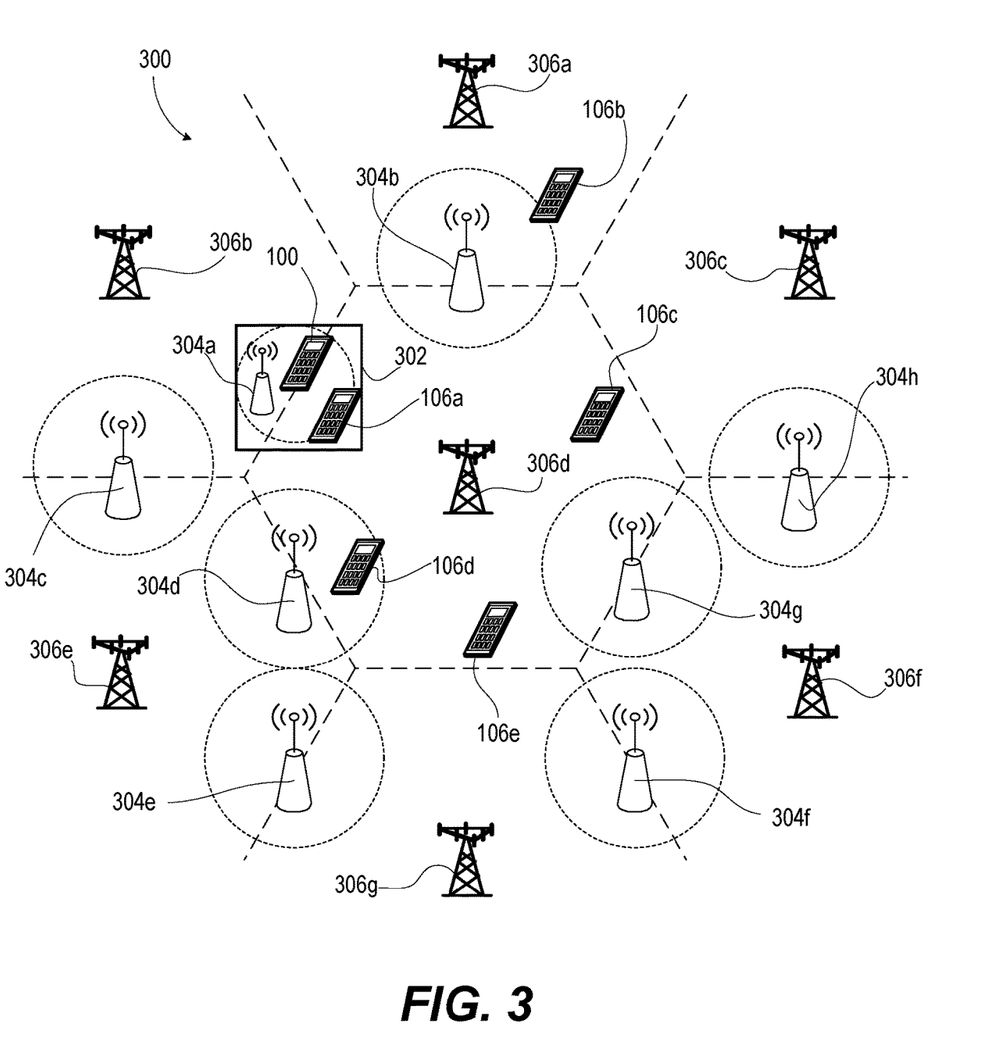
FIG. 3 depicts a plan view of communication devices within a facility with an internal fifth generation new radio (5G NR) base station, according to one or more embodiments.

FIG. 3 depicts a plan view of cellular network 300 with communication device 100 inside facility 302 that is serviced internally by fifth generation new radio (5G NR) base station 304a. Indoor base station 304a can be referred to as a "micro base station". Other 5G NR base stations 304b-304h are outside of facility 302. Second communication device 106a is inside of facility 302 and second communication devices 106b-106e are outside of facility 302. Cellular base stations 306a-306g operate using radio access technologies (RATs) at lower frequencies that can achieve greater ranges, respectively providing service to communication device 100 and second communication devices 106a-106e when the devices are within communication range. As an example, cellular base stations 306a-306g can support 4G LTE and 5G NR at sub-6 gigahertz (GHz) frequencies. Facility 302 is serviced internally by fifth generation new radio (5G NR) base station 304a. 5G NR protocols enable use of spectrum in the existing LTE frequency range (600 MHz to 6 GHz) and also in millimeter wave bands (24-86 GHz). The short wavelength allows modest size antennas to have a small beam width, further increasing frequency reuse potential.

Figure 4:
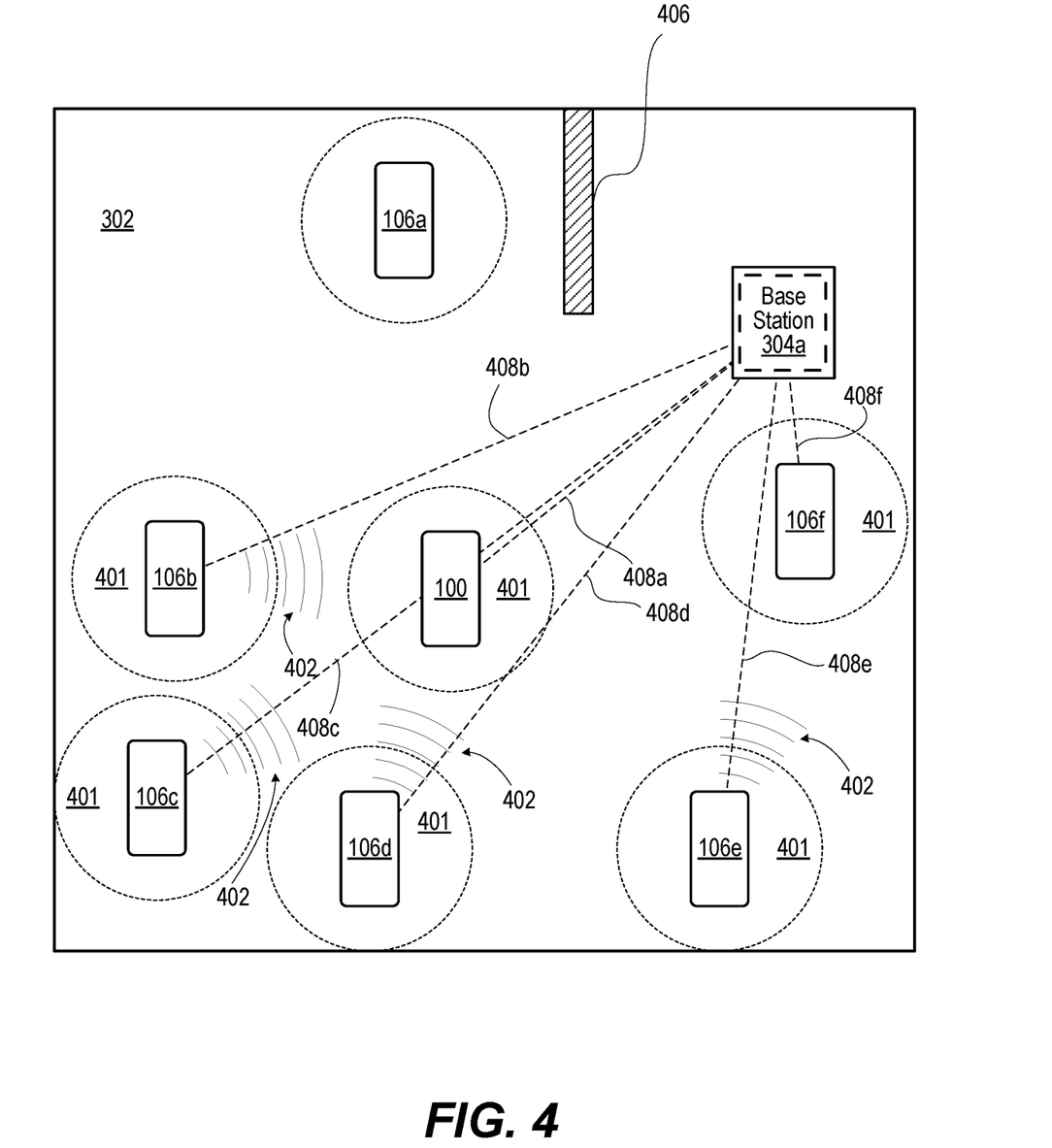
FIG. 4 depicts a plan view of one communication device in the facility of FIG. 3 measuring reference signals from second communication devices to determine relative locations of the second communication devices, according to one or more embodiments.

FIG. 4 depicts a plan view of communication device 100 inside facility 302 measuring reference signals 402 from at least some of second communication devices 106a-106f to determine relative locations of the second communication devices 106a-106f. Communication device 100 can learn of potential interfering transmissions to or from second communication devices 106a-106f in full spherical scanning area 401. Communication device 100 can use ad hoc networking protocols for a peer-to-peer communication session, can monitor scheduling of second communication devices 106a-106f by base station 304a, or use other scanning techniques.

Communication device 100 can perform direction and range finding of reference signals 402 to determine relative locations of second communication devices 106a-106f. Communication device 100 can receive information from other communication devices 106a-106f that indicate their relative location, such as to base station 304a, or an absolute geospatial location, such as by GPS augmented by dead reckoning with facility 302.

Some of other communication devices 106a-106f can have a potential for interference, such as if currently unconnected to base station 304a but along the same approximate vector as communication device 100 to base station 304a. Some of other communication devices 106a-106f can actively interfere with communication device 100, such as when base station 304a schedules different but adjacent beams/sectors to concurrently communicative with both communication device 100 and other communication device 106c. Within the example figure, base station 304a is obstructed by obstacle 406 from having a direct communication path with second communication device 106a. Base station 304a has a direct communication path 408a with communication device 100. Base station 304a has direct communication paths 408b-408f respectively with second communication devices 106b-106f.

Figure 5:
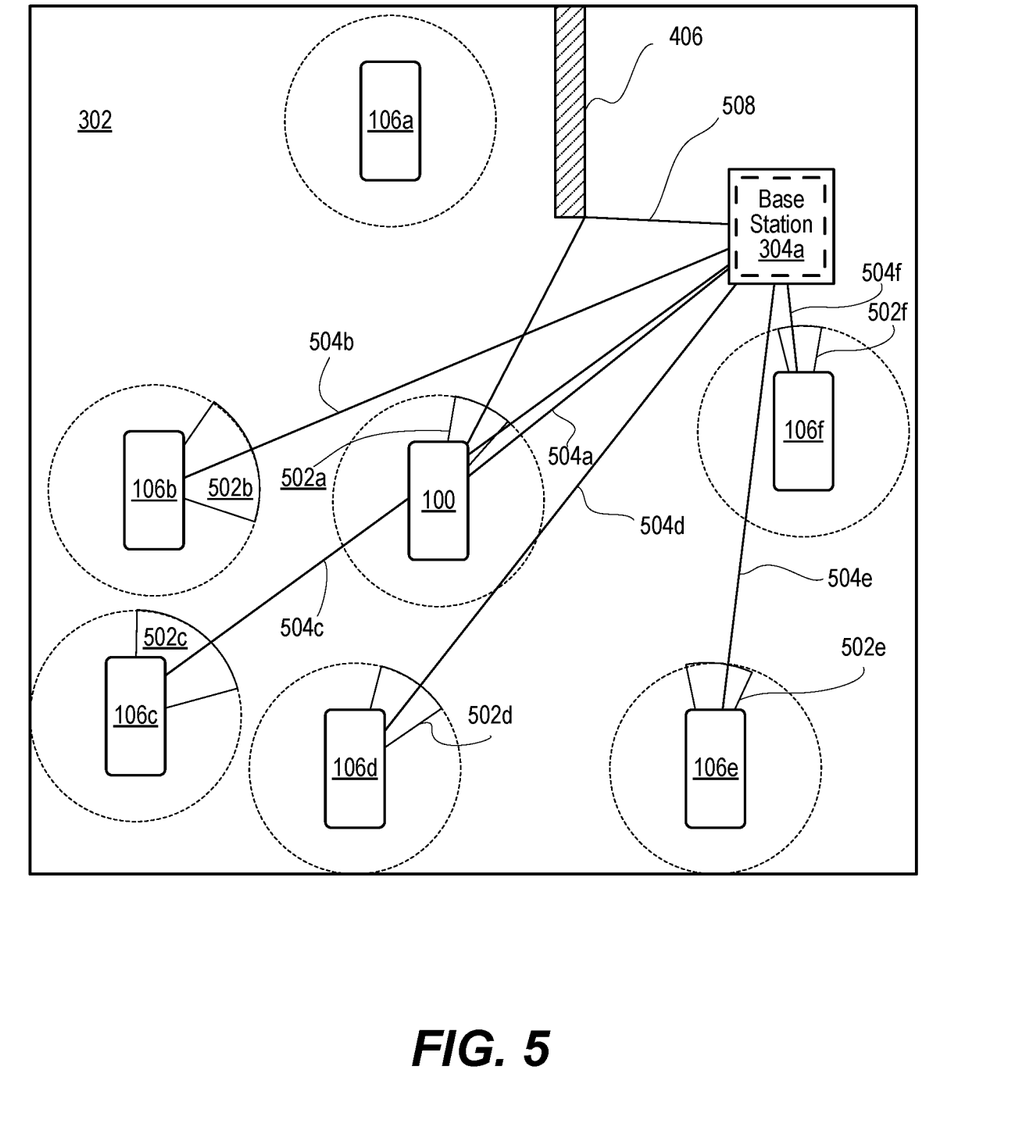
FIG. 5 depicts a plan view of the communication device within the facility of FIG. 3 selecting a reduced codebook for mobility management, which mitigates device-to-device interference, according to one or more embodiments.

FIG. 5 depicts a plan view of communication device 100 within facility 302 that has selected a reduced codebook for mobility management, which mitigates device-to-device interference. Entries for beams that receive the interfering signal are left out of the reduced codebook. Second communication device 106f is using a reduced codebook to provide an acquisition cone 502f that is steered away from downlink 504e to second communication device 106e. Communication device 100 is unable to sufficiently steer acquisition cone 502a to obtain a direct downlink 504a from base station 304a. However, communication device 100 is able to find an offset for acquisition cone 502a that receive multipath downlink 508 without receiving interference from downlink 504c transmitted by base station 304a to second communication device 106c. Second communication devices 106b-106e are using acquisition cones 502b-502e to receive downlinks 504b-504e, respectively.

Figure 6A:
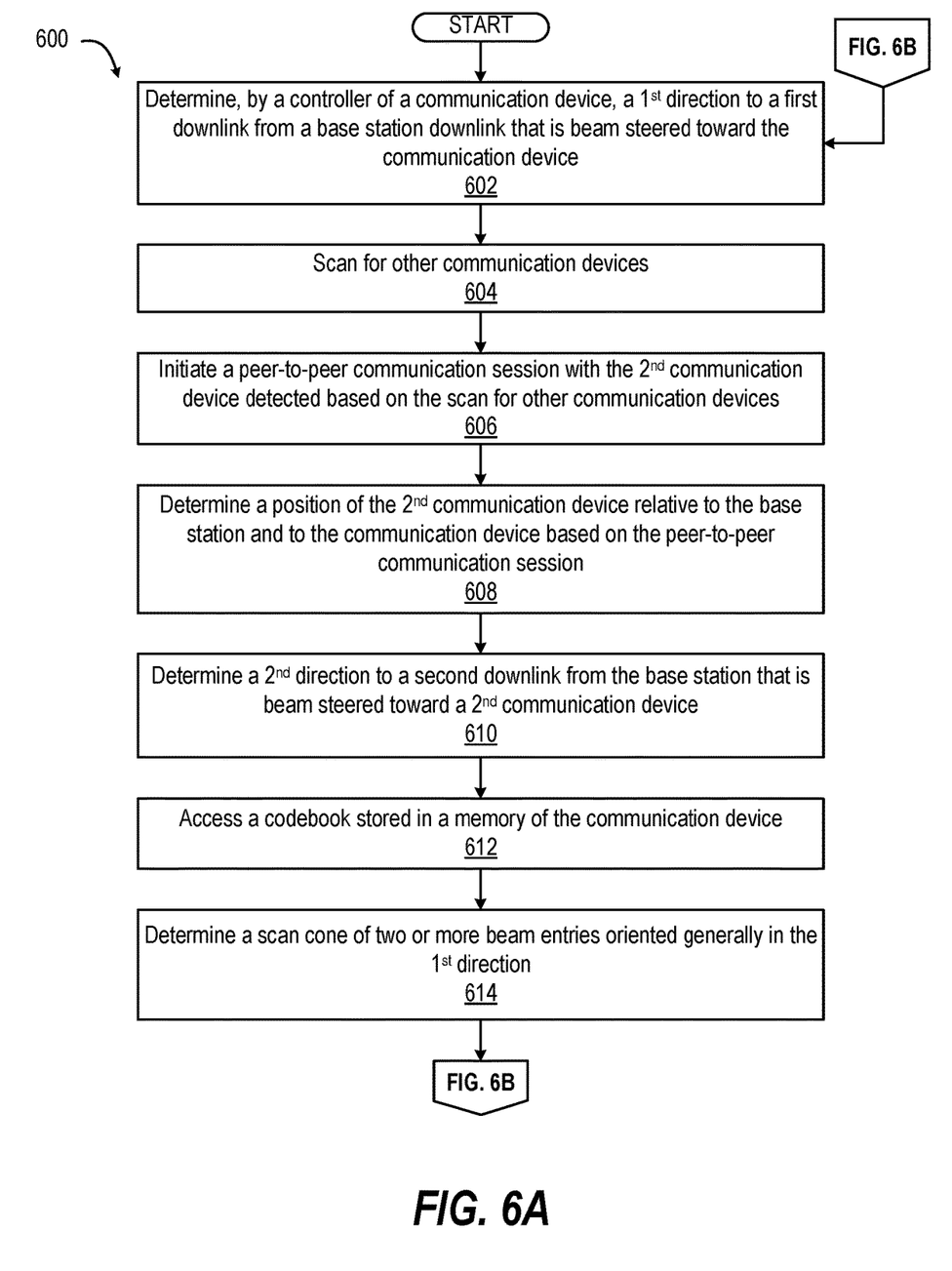
FIGS. 6A-6C (FIG. 6) present a flow diagram of a method for mitigating device-to-device interference during mobility management of antenna beam selection, according to one or more embodiments.
Figure 6B:
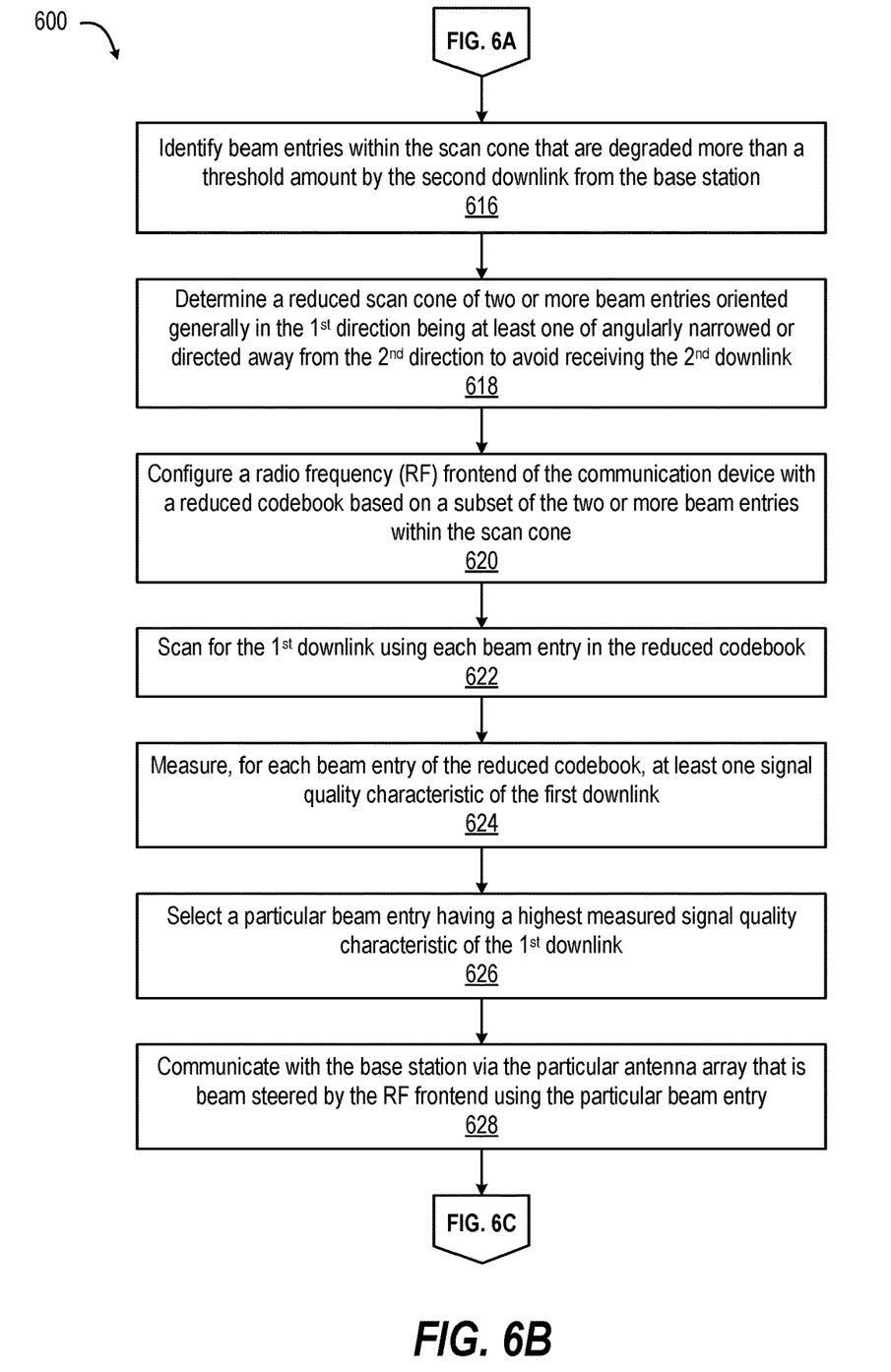
Figure 6C:
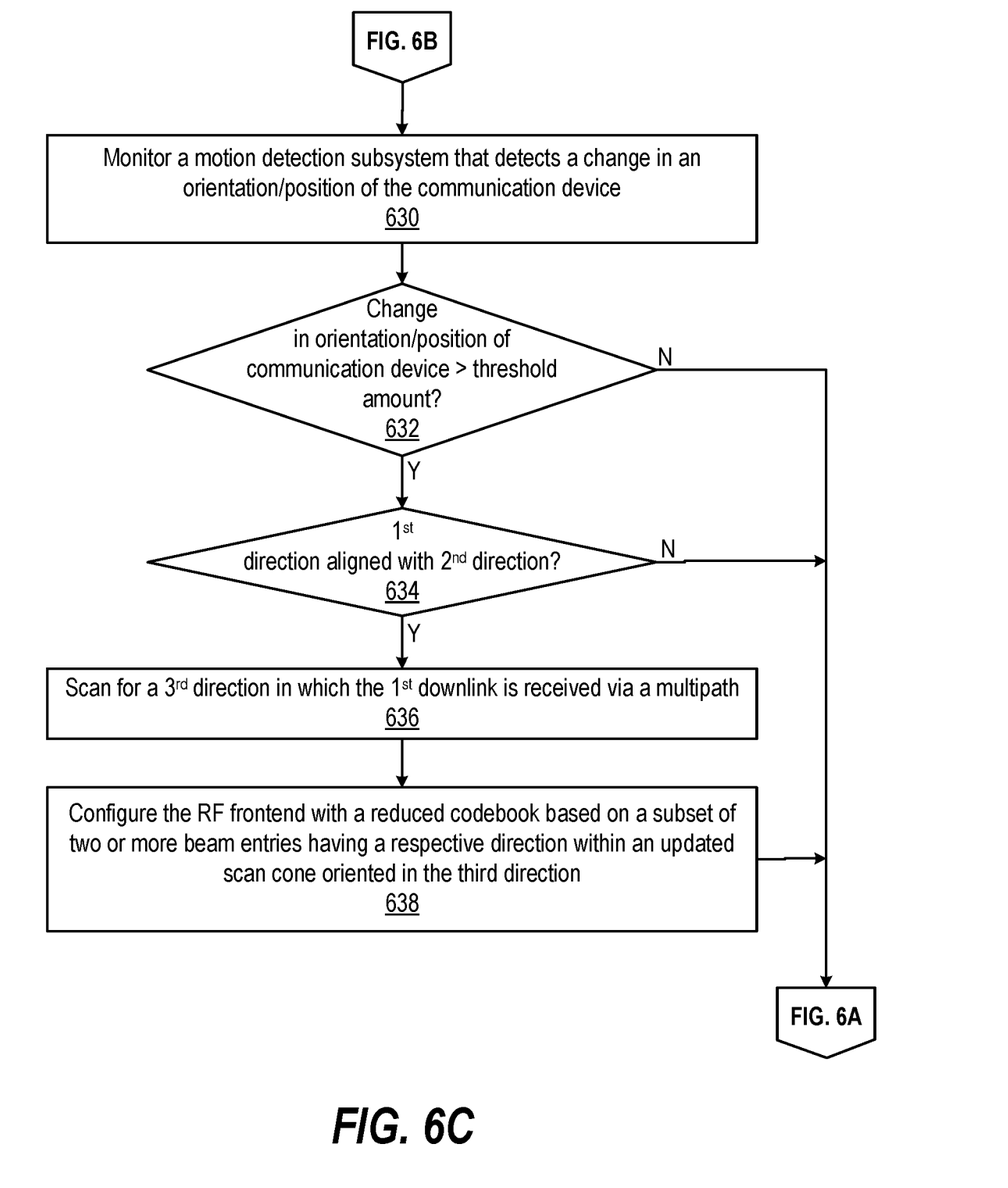

FIGS. 6A-6C (FIG. 6) present a flow diagram of a method for mitigating device-to-device interference during mobility management of antenna beam selection by an electronic device such as communication device 100 (FIG. 1). In at least one embodiment, communication device 100, managed by controller 101, executes mobility management application 115 (FIG. 1) to maintain a reduced codebook for communication services. The description of method 600 is provided with general reference to the specific components illustrated within the preceding FIGS. 1-5. Consequently, specific components referenced in method 600 can be identical or similar to components of the same name used to describe preceding FIGS. 1-5. With reference to FIG. 6A, method 600 includes determining, by a controller of a communication device, a first direction to a first downlink from a base station downlink that is beam steered toward the communication device (block 602). Method 600 includes scanning for other communication devices to identify a second communication device (block 604). Method 600 includes initiating a peer-to-peer communication session with the second communication device that is detected based on the scan for other communication devices (block 606). Method 600 includes determining a position of the second communication device relative to the base station and to the communication device based on the peer-to-peer communication session (block 608). Method 600 includes determining a second direction to a second downlink from the base station that is beam steered toward the second communication device (block 610). Method 600 includes accessing a codebook stored in a memory of the communication device (block 612). The codebook contains two or more beam entries defined by a magnitude setting and a phase setting respectively for each antenna element of a particular antenna array of the communication device. Each beam entry spatially steers a primary antenna gain of the particular antenna array in a respective direction relative to the communication device. Method 600 includes determining a scan cone of two or more beam entries oriented generally in the first direction (block 614).

With reference to FIG. 6B, method 600 includes identifying beam entries within the scan cone that are degraded more than a threshold amount by the second downlink from the base station (block 616). Method 600 includes determining a reduced scan cone of two or more beam entries oriented generally in the first direction being at least one of angularly narrowed or directed away from the second direction to avoid receiving the second downlink (block 618). Method 600 includes configuring a radio frequency (RF) frontend of the communication device with a reduced codebook based on a subset of the two or more beam entries within the scan cone (block 620). Method 600 includes scanning for the first downlink using each beam entry in the reduced codebook (block 622). Method 600 includes measuring, for each beam entry of the reduced codebook, at least one signal quality characteristic of the first downlink (block 624). Method 600 includes selecting a particular beam entry having a highest measured signal quality characteristic of the first downlink (block 626). Method 600 includes communicating with the base station via the particular antenna array that is beam steered by the RF frontend using the particular beam entry (block 628).

With reference to FIG. 6C, method 600 includes monitoring a motion detection subsystem that detects a change in an orientation/position of the communication device (block 630). Method 600 includes determining whether a change in orientation/position of the communication device is greater than a threshold amount (decision block 632). In response to determining that a change in the orientation/position of the communication device is not greater than the threshold amount, method 600 returns to block 602 (FIG. 6A). In response to determining that a change in the orientation/position of the communication device is greater than the threshold amount, method 600 includes determining whether the first direction is aligned with the second direction (decision block 634). In response to determining that the first direction is not aligned with the second direction, method 600 returns to block 602 (FIG. 6A). In response to determining that the first direction is aligned with the second direction, method 600 includes scanning for a third direction in which the first BS downlink is received via a multipath (block 636). Method 600 includes configuring the RF frontend with a reduced codebook based on a subset of two or more beam entries having a respective direction within an updated scan cone oriented in the third direction (block 638). The updated scan cone is at least one of angularly narrowed and directed away from the second direction to avoid receiving the second downlink. Then method 600 returns to block 602 (FIG. 6A).

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A communication device, comprising:
   at least one antenna array having more than one antenna element;
   a radio frequency (RF) frontend that is communicatively coupled to a particular antenna array of the at least one antenna array;
   a memory containing a codebook manager application and a codebook containing two or more beam entries defined by a magnitude setting and a phase setting respectively for each antenna element of the particular antenna array, each beam entry spatially steering a primary antenna gain of the particular antenna array in a respective direction relative to the communication device; and
   a controller communicatively coupled to the RF frontend and the memory, and which executes the codebook manager application to configure the communication device to:
      determine a first direction to a first downlink from a base station downlink that is beam steered toward the communication device;
      determine a position of a second communication device relative to the base station and to the communication device based on a peer-to-peer communication session;
      determine a second direction to a second downlink from the base station that is beam steered toward the second communication device;
      determine a scan cone of two or more beam entries oriented generally in the first direction and being at least one of angularly narrowed or directed away from the second direction to avoid receiving the second downlink; and
      configure the RF frontend of the communication device with a reduced codebook based on a subset of the two or more beam entries within the scan cone for mobility management of the communication device.

2. The communication device of claim 1, wherein the controller further configures the communication device to:
   scan for the first downlink using each beam entry in the reduced codebook;
   measure, for each beam entry of the reduced codebook, at least one signal quality characteristic of the first downlink;
   select a particular beam entry having a highest measured signal quality characteristic of the first downlink; and
   communicate with the base station via the particular antenna array that is beam steered by the RF frontend using the particular beam entry.

3. The communication device of claim 1, further comprising a motion detection subsystem that detects a change in an orientation of the communication device, wherein the controller:
   in response to the detected change in the orientation of the communication device;
      determines an updated first direction to the first downlink from the base station downlink that is beam steered toward the communication device;
      determines an updated second direction to the second downlink from the base station that is beam steered to the second communication device; and
      configures the RF frontend with an updated reduced codebook based on an updated subset of two or more beam entries having a respective direction within an updated scan cone oriented in the updated first direction, the updated scan cone being at least one of angularly narrowed or directed away from the updated second direction to avoid receiving the second downlink.

4. The communication device of claim 1, further comprising a motion detection subsystem that detects a change in a position of the communication device, wherein the controller:
in response to the detected change in the position of the communication device;
determines an updated first direction to the first downlink from the base station downlink that is beam steered toward the communication device;
determines an updated second direction to the second downlink from the base station that is beam steered to the second communication device; and
configures the RF frontend with an updated reduced codebook based on an updated subset of two or more beam entries having a respective direction within an updated scan cone oriented in the updated first direction, the updated scan cone being at least one of angularly narrowed or directed away from the updated second direction to avoid receiving the second downlink.

5. The communication device of claim 1, wherein, in response to determining that the first direction is aligned with the second direction, the controller:
scans for a third direction in which the first downlink is received via a multipath; and
configures the RF frontend with a reduced codebook based on a subset of two or more beam entries having a respective direction within an updated scan cone oriented in the third direction, the updated scan cone being at least one of angularly narrowed or directed away from the second direction to avoid receiving the second downlink.

6. The communication device of claim 1, wherein the controller transmits an interference report to the base station to enable the base station to beam steer the interfering second downlink to the second communication device away from the communication device.

7. The communication device of claim 1, wherein, to determine the second direction, the controller:
scans for other communication devices; and
initiates the peer-to-peer communication session with the second communication device detected based on the scan for other communication devices.

8. A method comprising:
determining, by a controller of a communication device, a first direction to a first downlink from a base station downlink that is beam steered toward the communication device;
determining a position of a second communication device relative to the base station and to the communication device based on a peer-to-peer communication session;
determining a second direction to a second downlink from the base station that is beam steered toward the second communication device;
accessing a codebook stored in a memory of the communication device, the codebook containing two or more beam entries defined by a magnitude setting and a phase setting respectively for each antenna element of a particular antenna array of the communication device, each beam entry spatially steering a primary antenna gain of the particular antenna array in a respective direction relative to the communication device;
determining a scan cone of two or more beam entries oriented generally in the first direction and being at least one of angularly narrowed or directed away from the second direction to avoid receiving the second downlink; and
configuring a radio frequency (RF) frontend of the communication device with a reduced codebook based on a subset of the two or more beam entries within the scan cone for mobility management of the communication device.

9. The method of claim 8, further comprising:
scanning for the first downlink using each beam entry in the reduced codebook;
measuring, for each beam entry of the reduced codebook, at least one signal quality characteristic of the first downlink;
selecting a particular beam entry having a highest measured signal quality characteristic of the first downlink; and
communicating with the base station via the particular antenna array that is beam steered by the RF frontend using the particular beam entry.

10. The method of claim 8, further comprising:
monitoring a motion detection subsystem that detects a change in an orientation of the communication device; and
in response to the detected change in the orientation of the communication device:
determining an updated first direction to the first downlink from the base station downlink that is beam steered toward the communication device;
determining an updated second direction to the second downlink from the base station that is beam steered to the second communication device; and
configuring the RF frontend with an updated reduced codebook based on an updated subset of two or more beam entries having a respective direction within an updated scan cone oriented in the updated first direction, the updated scan cone being at least one of angularly narrowed or directed away from the updated second direction to avoid receiving the second downlink.

11. The method of claim 8, further comprising:
monitoring a motion detection subsystem that detects a change in a position of the communication device; and
in response to the detected change in the position of the communication device:
determining an updated first direction to the first downlink from the base station downlink that is beam steered toward the communication device;
determining an updated second direction to the second downlink from the base station that is beam steered to the second communication device; and
configuring the RF frontend with an updated reduced codebook based on an updated subset of two or more beam entries having a respective direction within an updated scan cone oriented in the updated first direction, the updated scan cone being at least one of angularly narrowed or directed away from the updated second direction to avoid receiving the second downlink.

12. The method of claim 8, further comprising:
in response to determining that the first direction is aligned with the second direction:
scanning for a third direction in which the first downlink is received via a multipath; and
configuring the RF frontend with a reduced codebook based on a subset of two or more beam entries having a respective direction within an updated scan cone oriented in the third direction, the updated scan cone being at least one of angularly narrowed or directed away from the second direction to avoid receiving the second downlink.

13. The method of claim 8, further comprising transmitting an interference report to the base station to enable the base station to beam steer an interfering downlink to the second communication device away from the communication device.

14. The method of claim 8, wherein determining the second direction comprises:
   scanning for other communication devices; and
   initiating the peer-to-peer communication session with the second communication device detected based on the scan for other communication devices.

15. A computer program product comprising:
   a computer readable storage device; and
   program code on the computer readable storage device that when executed by a processor associated with a device, the program code enables the communication device to provide the functionality of:
      determining, by a controller of a communication device, a first direction to a first downlink from a base station downlink that is beam steered toward the communication device;
      determining a position of a second communication device relative to the base station and to the communication device based on a peer-to-peer communication session;
      determining a second direction to a second downlink from the base station that is beam steered toward the second communication device;
      accessing a codebook stored in a memory of the communication device, the codebook containing two or more beam entries defined by a magnitude setting and a phase setting respectively for each antenna element of a particular antenna array of the communication device, each beam entry spatially steering a primary antenna gain of the particular antenna array in a respective direction relative to the communication device;
      determining a scan cone of two or more beam entries oriented generally in the first direction and being at least one of angularly narrowed or directed away from the second direction to avoid receiving the second downlink; and
      configuring a radio frequency (RF) frontend of the communication device with a reduced codebook based on a subset of the two or more beam entries within the scan cone for mobility management of the communication device.

16. The computer program product of claim 15, wherein the program code enables the communication device to provide the functionality of:
   scanning for the first downlink using each beam entry in the reduced codebook;
   measuring, for each beam entry of the reduced codebook, at least one signal quality characteristic of the first downlink;
   selecting a particular beam entry having a highest measured signal quality characteristic of the first downlink; and
   communicating with the base station via the particular antenna array that is beam steered by the RF frontend using the particular beam entry.

17. The computer program product of claim 15, wherein the program code enables the communication device to provide the functionality of:
   monitoring a motion detection subsystem that detects a change in an orientation of the communication device; and
   in response to the detected change in the orientation of the communication device:
      determining an updated first direction to the first downlink from the base station downlink that is beam steered toward the communication device;
      determining an updated second direction to the second downlink from the base station that is beam steered to the second communication device; and
      configuring the RF frontend with an updated reduced codebook based on an updated subset of two or more beam entries having a respective direction within an updated scan cone oriented in the updated first direction, the updated scan cone being at least one of angularly narrowed or directed away from the updated second direction to avoid receiving the second downlink.

18. The computer program product of claim 15, wherein the program code enables the communication device to provide the functionality of:
   monitoring a motion detection subsystem that detects a change in a position of the communication device; and
   in response to the detected change in the position of the communication device:
      determining an updated first direction to the first downlink from the base station downlink that is beam steered toward the communication device;
      determining an updated second direction to the second downlink from the base station that is beam steered to the second communication device; and
      configuring the RF frontend with an updated reduced codebook based on an updated subset of two or more beam entries having a respective direction within an updated scan cone oriented in the updated first direction, the updated scan cone being at least one of angularly narrowed or directed away from the updated second direction to avoid receiving the second downlink.

19. The computer program product of claim 15, wherein the program code enables the communication device to provide the functionality of:
   in response to determining that the first direction is aligned with the second direction:
      scanning for a third direction in which the first downlink is received via a multipath; and
      configuring the RF frontend with a reduced codebook based on a subset of two or more beam entries having a respective direction within an updated scan cone oriented in the third direction, the updated scan cone being at least one of angularly narrowed or directed away from the second direction to avoid receiving the second downlink.

20. The computer program product of claim 15, wherein the program code enables the communication device to provide the functionality of determining the second direction by:
   scanning for other communication devices; and
   initiating the peer-to-peer communication session with the second communication device detected based on the scan for other communication devices.

* * * * *